Figure 1:
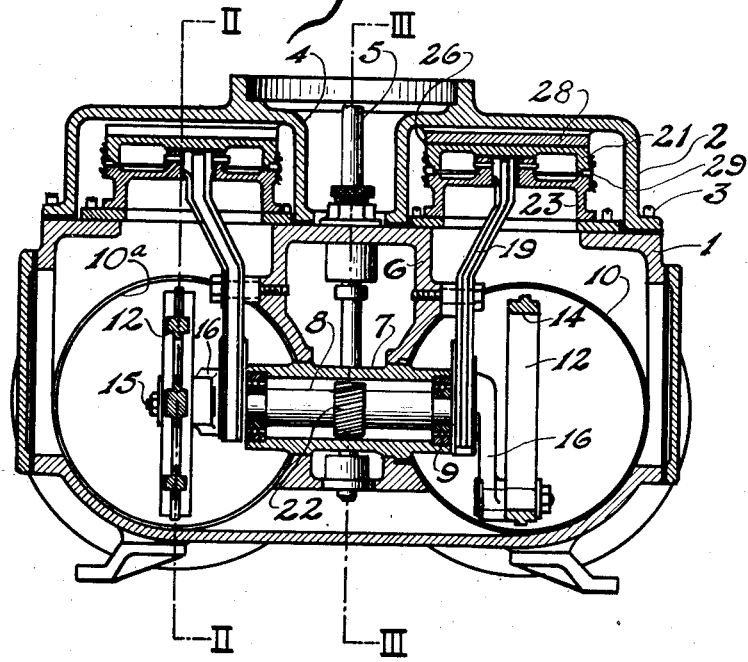

July 27, 1937.　　　　L. McCANDLESS　　　　2,088,270
BULK METER
Original Filed Feb. 3, 1933　　2 Sheets-Sheet 1

INVENTOR
Lyon McCandless
by William B. Jaspert
Attorney.

July 27, 1937.　　　L. McCANDLESS　　　2,088,270
BULK METER
Original Filed Feb. 3, 1933　　2 Sheets-Sheet 2

INVENTOR
Lyon McCandless
by William B. Jaspert
Attorney.

Patented July 27, 1937

2,088,270

UNITED STATES PATENT OFFICE 2,088,270

BULK METER

Lyon McCandless, Beaver Falls, Pa.

Original application February 3, 1933, Serial No. 655,055. Divided and this application December 30, 1933, Serial No. 704,616

3 Claims. (Cl. 73—233)

This invention relates to fluid meters and more particularly meters commonly referred to in the trade as bulk meters such as may be employed on pipe lines at refineries and at bulk handling stations and this application is a division of an application serially numbered 655,055 filed February 3, 1933.

The object of the invention is the provision of means for automatically effecting adjustment for temperature variations in the fluid whereby any change in volume of the fluid due to temperature changes is automatically corrected to 60° F. which is the standard temperature to which crude and refined oils are usually corrected when hot and cold.

Figure 2:
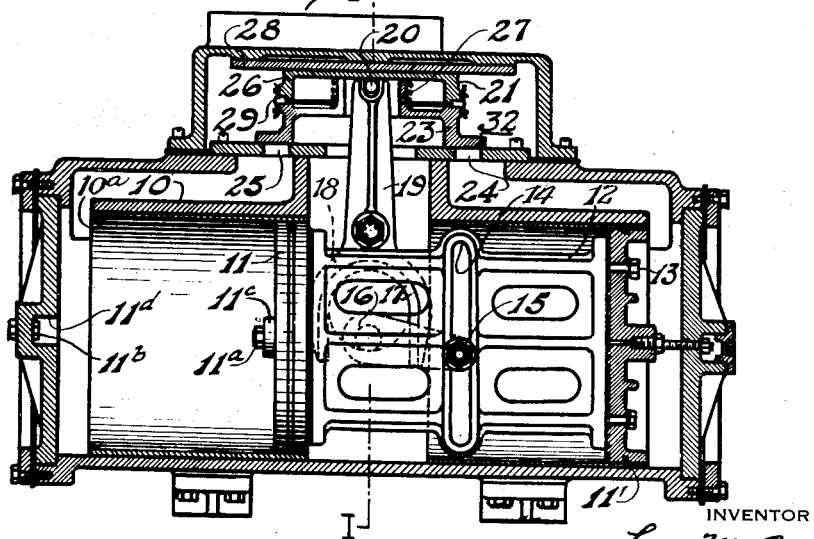
Figure 3:
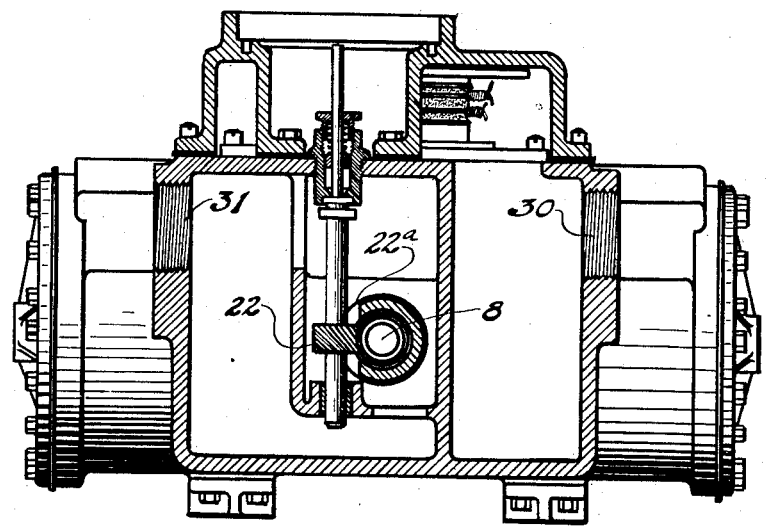
Figure 4:
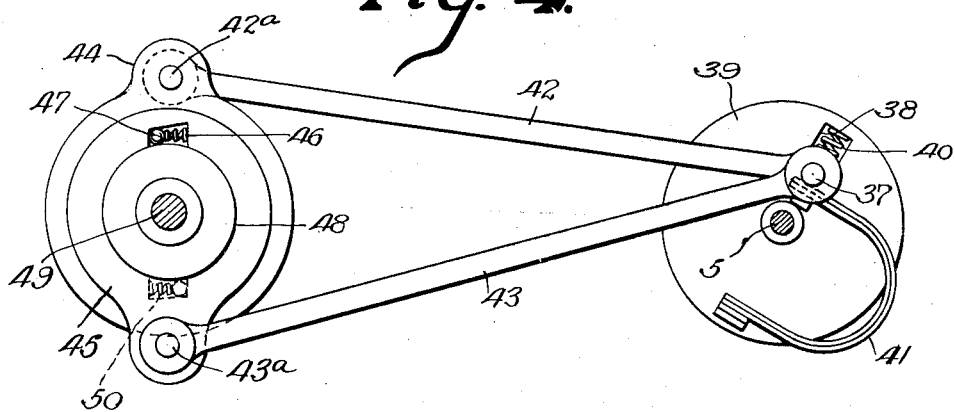

This and other objects of the invention will become more apparent from a consideration of the accompanying drawings constituting a part hereof in which like reference characters designate like parts and in which:

Figure 1 is a cross-sectional view of a fluid meter embodying the principles of this invention;

Figure 2 a cross-sectional view taken along the lines II—II of Figure 1;

Figure 3 a cross-section taken along the lines III—III of Figure 1;

Figure 4 a top plan view of a temperature compensating device connected to the meter shaft in a manner hereinafter explained.

With reference to Figures 1 to 3 inclusive of the drawings, the structure therein illustrated comprises a meter housing 1 having a hollow casting 2 secured thereto by bolts 3, the casting constituting a valve chest or compartment and having a central cored out portion 4 through which a meter shaft 5 projects for connecting the meter with a registering or indicating mechanism (not shown).

The housing 1 is provided with a web portion 6 integrally formed therewith which is bored out for receiving a sleeve 7 in which is mounted a crank shaft 8 journalled by anti-friction bearings 9. The interior of the housing 1 is provided with a plurality of cylinders 10 arranged with their axes in parallel relation for receiving a plurality of piston members 11, there being a pair of such pistons in each of the cylinder bores, each pair of pistons being joined by a yoke 12 to which they are secured by cap bolts 13.

The yokes 12 are provided with an elongated slot 14 in which a crank pin 15 is disposed for movement, the pin moving back and forth axially in the slot 14 in response to movement of the piston members 11 as will be hereinafter explained in connection with the description of the operation of the meter. The cylinders 10 are preferably provided with liners 10a of a non-corroding metal such as brass or stainless steel, and the piston elements 11 are provided with metal packing rings 11'.

The parallel pistons 11 are connected through their yokes 12 by a plurality of cranks 16, Figures 1 and 2, the cranks being actuated through the crank pins 15 operating in the slots 14. Cranks 16 are provided with integral eccentrics 17 which cooperate with yokes 18 of levers 19 that extend upwardly into the valve chamber and engage connecting pins 20 of valves 21. The cranks 16 are connected to the ends of the shaft 8 which carries a gear wheel 22 to rotate the meter shaft 5.

Pistons 11 are provided with extensions 11a which constitute abutments that engage adjustable stops 11b in cylindrical recesses which determine the length of the piston stroke independently of the connected crank mechanism. Sufficient clearance is provided for the crank pin connection with the yokes to permit full length of travel of pistons. Stop 11a is provided with a cylindrical portion 11c that enters cylindrical recess 11d to provide a dash-pot effect which prevents jarring of pistons 11 at end of stroke.

In Figures 1 and 2 of the drawings, the valves 21 are illustrated as slide valves consisting of a lower part 23 which controls valve passages 24 and 25 that communicate with the cylinder chambers 10, and an upper portion 26 which is biased by a coil spring 27 to hold it in contact with a slide or pressure plate 28.

A sealing annulus 29 is fitted into grooves provided in the members 23 and 26 to prevent the fluid of the valve chamber entering between the two halves 23 and 26 of the slide valve.

With reference to Figure 3 of the drawings, the reference numeral 30 designates the inlet flow connection for the meter, and 31 the delivery connection, inlet 30 communicating with valve chamber 32, Figure 2, and the delivery passage 31 communicating with the portion of the chambers of cylinders 10 between the piston elements 11 and all of the interior in which the levers 19 are disposed including the discharge side of the valves 21.

It is to be noted that all of the linkage connecting the valve 21 with the measuring pistons 11 is disposed on the discharge side of the meter so that no parts are provided on the pressure side which would necessitate a more complex construction and require the use of fluid packing as in the prior art devices.

As the volume of the fluid such as petroleum or gasoline changes considerably with any variations in temperature, corrections for such variations must be made repeatedly, and to avoid the making of adjustments I have devised a means which automatically compensates for temperature variations and which consists of the following mechanism.

With reference to Figure 4 of the drawings, 5 designates the meter shaft shown in Figures 1 and 2. Mounted on the shaft 5 is a crank pin 37 movable in a slot 38 of a disc 39, the pin being biased at one end by a coil spring 40 and at its other end by a bi-metallic element 41 which at one end abuts against pin 37 and its other end is fastened in some convenient manner to the plate 39.

Connected to the crank pin 37 are a plurality of links 42 and 43 pivoted at 42a and 43a respectively to ratchet members 44 and 45. The ratchets are provided with tangent grooves or slots as shown at 46, and are provided with balls 47 that are adapted to wedge between the upper faces of the slots 46 and the outer surface of a disc 48 that is keyed to the register drive shaft 49. The balls 47 are biased by coil springs 50 to retain them in the wedge shaped portion of the slot so as to maintain contact with the surface of the member 48.

The above described mechanism operates briefly as follows: With the inlet 30 of the meter connected to a pumping system or other source of fluid pressure and with valve 21 positioned in such manner as to partly open the fluid passage 24, the fluid will flow to the front of one of the piston elements 11 causing its displacement into cylinder 10, and any fluid in the cylinder chamber of the complementary piston element will be displaced through the valve passage 25 to the interior or delivery side of valve 21 from which it passes through the discharge opening 31 to a service line or container. While the piston 11 is moving longitudinally in cylinder chambers 10, the crank pin 15 will be subjected to angular movement through its engagement with the slot 14 of the yoke and cause shaft 8 to be rotated simultaneously with the movement of crank 16. The eccentrics 17 will actuate levers 19 to cause a corresponding movement of the valves 21 in positive timed relation with the movement of the piston element so that when the piston has traversed one half of its stroke, the valve passages 24 and 25 will be wide open causing a maximum flow of the fluid to and from the meter.

As shown in Figure 1 of the drawings, cranks 16 are 90° apart so that when one set of pistons is on dead center as shown in Figure 2, the other set is operative to cause rotation of the cranks and consequently the connected valve mechanism whereby a substantially uniform volume of fluid passes through the meter at all times.

The construction of the movable parts is such that minimum wear will result from the operation of the device as all of the movable elements are designed to have maximum contacting surfaces whereby a minimum amount of strain is concentrated thereon.

As previously explained, the valve chamber is connected to the inlet connection 30 so that it is at all times filled with fluid under pressure and the pressure acting all around the valve 21 will not cause any excess pressure on any of its contacting sides which in prior art devices resulted in excessive wear.

As the piston elements 11 are actuated back and forth through operation of the valve 21, the meter shaft 5 is actuated through crank shaft 8 by the connecting gears 22, and as the meter shaft is connected to a register or indicating mechanism (not shown) the amount of fluid displaced by pistons 11 will be registered by such mechanism.

With reference to the automatic regulation of the register mechanisms for temperature variations, the device illustrated in Figure 4 of the drawings functions in the following manner.

The meter shaft 5, upon rotation will operate crank 39 which, in turn, subjects the ratchet elements 44 and 45 to angular movement causing the balls 47 to engage the disc that operates the register drive shaft for one direction of movement and release the same in the opposite direction. As the bi-metallic element 41 will change its length in response to temperature variations, it will effect a corresponding movement or displacement of the crank pin 37 so that the stroke of links 42 and 43 will be varied in response to variations in thermal conditions, thus effecting a corresponding lag or increase in movement of the register shaft 49. By means of such a device, the difference in volume of the fluid dispensed or measured will be compensated for so that a volume corresponding to the standard volume for 60° F. will be registered on the meter register.

It is evident from the foregoing description of the invention that a meter of the character therein described is of rugged mechanical construction, embodies a minimum number of mechanical parts, and is positive in its operation particularly in maintaining accurate timing of the valve with the piston movement. Also, by operating the valve mechanism through linkage disposed in the discharge pressure side of the system, leakage resulting from packings and connections employed in prior art devices are eliminated thus making the metering device more accurate and useful.

Although one embodiment of the invention has been herein illustrated and described, it will be obvious to those skilled in the art that various modifications may be made in the details of construction without departing from the principles herein set forth.

I claim:

1. In a metering device for measuring fluids, a meter shaft and a register shaft, a ratchet mounted on the register shaft and a disk having a slot mounted on said meter shaft, a crank pin movably mounted in said slot, crank arms connecting the pin to the ratchet mechanism, means normally biasing the crank pin of the meter shaft in one direction, and temperature responsive means operative against the tension of the biasing means for altering the location of the crank pin in response to the temperature changes thereby varying the stroke of the crank arms to vary the extent of movement of the ratchet mechanism.

2. In a metering device for measuring fluids, a meter shaft and a register shaft, a ratchet mechanism mounted on the register shaft and a crank having a crank pin mounted on the meter shaft, links connecting said crank pin and ratchet mechanism, a bimetallic element and coil spring constituting opposite abutments for said crank pin, said bimetallic element being responsive to temperature changes to vary the stroke of the crank pin thereby varying the extent of movement of the ratchet mechanism.

3. In a metering device for measuring fluids, a meter shaft, a disk mounted on the meter shaft, a register shaft, a ratchet mechanism mounted on the register shaft, said ratchet mechanism comprising a pair of annular members having tangential slots, balls and coil springs in said slots in contact with a cylindrical surface of the register shaft, said springs biasing the ball members against one end of their slots so that during movement of the annular members the balls will wedge against the cylindrical surface of the register shaft to lock therewith and advance said shaft, a crank pin mounted on the disk of the meter shaft, links connecting said crank pin with the annular members of the ratchet mechanism, the crank pin being yieldingly mounted in the disk of the meter shaft, and a bimetallic element connected at one end to said crank pin to vary the radial position thereof relative to the meter shaft in response to temperature changes.

LYON McCANDLESS.